April 14, 1931. W. R. MITTENDORF 1,800,741
COMPUTING SCALE
Filed Oct. 17, 1923 3 Sheets-Sheet 3

Inventor
WILLIAM R. MITTENDORF.

Patented Apr. 14, 1931

1,800,741

UNITED STATES PATENT OFFICE

WILLIAM R. MITTENDORF, OF CINCINNATI, OHIO, ASSIGNOR, BY MESNE ASSIGNMENTS, TO INTERNATIONAL BUSINESS MACHINES CORPORATION, OF NEW YORK, N. Y., A CORPORATION OF NEW YORK

COMPUTING SCALE

Application filed October 17, 1923. Serial No. 669,135.

This invention relates to computing scales and more particularly to counting scales of the beam type.

One object of the invention is to provide a scale of the beam type which will accurately determine the number of parts in a mass of like parts placed upon the load platform.

A further object of the invention is to provide a counting scale which will be portable.

A further object of the invention is to provide a counting scale which will be simple in its construction and inexpensive to manufacture.

A further object of the invention is to provide a counting scale which will have no delicately adjusted parts which may be easily thrown out of balance.

A further object of the invention is to provide a counting scale comprising both a load balance of the beam type and a unit balance of the beam type.

A further object of the invention is to provide a device for adjusting a poise on the beam which will not influence the movement of the beam.

A further object of the invention is to provide a device for adjusting both a poise and an indicating member with relation to a beam which device will not influence the movement of the beam.

Other objects of the invention will appear as the device is described in detail.

In the accompanying drawings

In these drawings I have illustrated one embodiment of my invention and have shown the same as applied to a counting scale comprising a load balance and a unit balance both of which are of the beam type but it will be understood that this particular embodiment of the invention has been chosen for the purposes of illustration only and that the invention as a whole, or selected features thereof, may be applied to scales of various kinds and, further, that the mechanism may take various forms without departing from the spirit of the invention.

In carrying out my invention I have provided a load balance comprising a beam and a poise carried thereby and adjustable lengthwise thereof, and associated with the load balance is an indicating member the position of which is controlled by the position of the poise on the beam. I have also provided a unit balance comprising a beam and a poise carried thereby and adjustable lengthwise thereof and associated with this unit balance is a second indicating member the position of which is controlled by the position of the poise on the beam of the unit balance. The two balances are wholly disconnected one from the other so that one does not in any way control or influence the operation of the other, but the two indicating members are so arranged that when the poises of the respective balances have been adjusted to balance respectively a load on the load platform of the load balance and a unit in the unit receptacle the two indicating members will cooperate to indicate the number of parts in the load on the load platform. In connection with each balance I have provided a device supported independently of the balance itself for adjusting the poise on the beam and have connected this adjusting device with the poise in such a manner that it will not in any way interfere with the movement of the beam or influence the balance thereof. This actuating device is also connected with the indicating member for the balance with which it is associated in such a manner that the indicating member will be moved to a position corresponding accurately to the position to which the poise is moved. While the mechanism of such a scale may take various forms I have in the present drawings illustrated one form of mechanism which will operate in a satisfactory manner.

Figure 1:
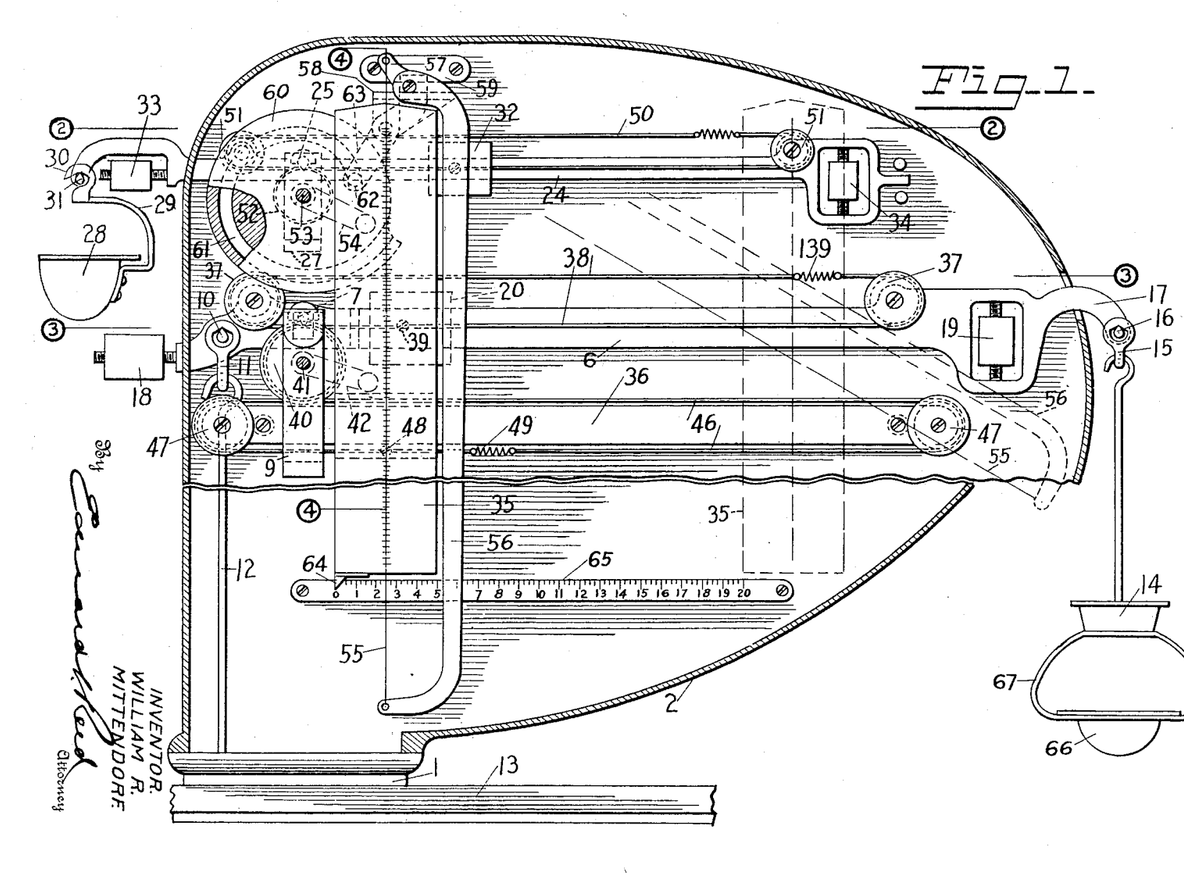
Fig. 1 is a front elevation of a scale embodying my invention, showing the casing in section and partly broken away.
Figure 2:
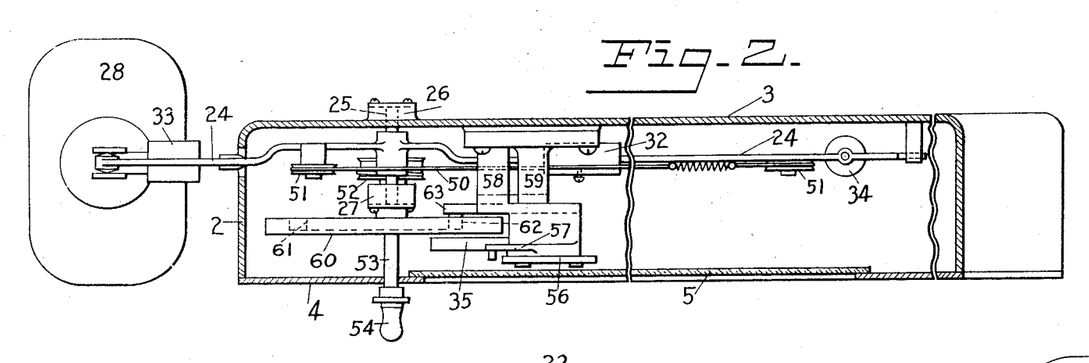
Fig. 2 is a section taken on the line 2—2 of Fig. 1.
Figure 3:
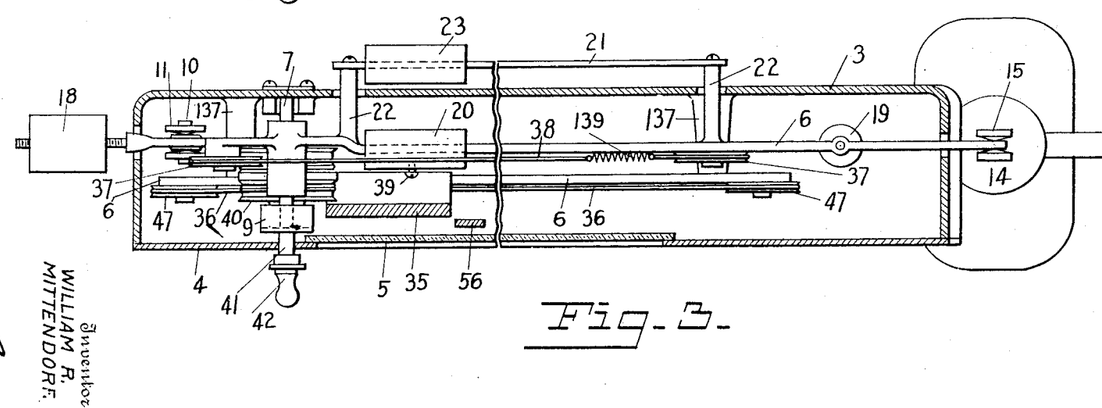
Fig. 3 is a section taken on the line 3—3 of Fig. 1.

In that particular embodiment of the invention here shown the scale comprises a standard 1 on which is supported a casing 2 which constitutes a main frame upon which various parts of the mechanism are mounted and within which the major portion of the mechanism is enclosed. Preferably this casing comprises a rigid back wall 3 and a front wall 4 having a relatively large opening which is closed by transparent material, such as a pane of glass 5, through which the operation of the balances may be noted and a reading taken from the indicating members. The load balance comprises a beam or lever 6 provided between its ends with knife edge pivots 7 by means of which it is supported in suitable V bearings one of which is carried by the rear wall 3 of the housing, as shown at 8, and the other of which is formed in the upright arm of a bracket 9 carried by the rear wall of the housing. On one side of its axis 7 the lever 6 is connected with a load platform and, in the present construction, it is provided, near its left hand end, in Fig. 1, with knife edge pivots 10 which engage bearings on the arms of a stirrup 11 which depends below the lever and is arranged to engage the hook of a draft rod 12 which extends downwardy through the standard 1 and is connected with a load platform 13, the connection being established either directly with the load platform or through suitable intermediate mechanism. At its opposite or right hand end the beam is provided with a counterpoise 14 which may also serve to receive loose weights when these are needed and which, in the present construction, is suspended from a stirrup 15 carried by knife edge pivots 16 secured to a goose neck 17 arranged at the extreme end of the beam. The beam is also provided with balance weights 18 and 19 which are adjustable along intersecting lines and which serve as a means for sealing the beam and the zero balance of the scale in the usual manner. As here shown, these balancing weights are arranged on opposite sides of the axis of the beam but obviously they may be applied to the beam in any suitable manner. Carried by the beam 6 and adjustable lengthwise thereof is a poise 20 which, in the present instance, is slidably mounted on the beam, the poise being here shown in its zero position. The scale may also be equipped with a tare beam and poise to counterbalance the weight of a receptacle which may be used as a container for the parts to be counted and, as here shown, a tare beam 21 is mounted on laterally extending projections 22 rigidly secured to the beam or lever 6 and a poise 23 is slidably mounted on the beam 21.

The unit balance comprises a lever or beam 24 which is pivotally supported between its ends and is here shown as supported by knife edge pivots 25 engaging ordinary V bearings one of which is carried by the rear wall of the housing, as shown at 26, and the other of which is formed in the upright arm of a bracket 27 carried by the rear wall of the housing. Pivotally supported from the beam on one side of its axis is a unit receptacle 28 which, as here shown, is supported by a holder 29 having bearing portions 30 which engage knife edge pivot pins 31 on the beam or lever 24. Supported by the beam 24 and preferably slidably mounted directly thereon is a poise 32, which is here shown in its zero position. The beam or lever 24 is provided with balancing weights 33 and 34 which are adjustable along intersecting lines and which serve as a means for sealing the lever and the balance in the usual manner.

The indicating members which are associated with the respective balances may be of any suitable character but, in the present instance, I have shown one member as comprising an elongated chart having thereon a single series of graduations and a plurality of columns of numerals, the corresponding numerals in the several columns being associated with the same graduation on the chart and indicating the variations in the significance or value of that graduation when different units of computation are used. In the present instance, the unit of computation is a unit consisting of one or more of the parts to be counted, which unit is placed in the unit receptacle 28, and therefore each column of numerals represents values based upon a unit consisting of a certain number of parts and each column is marked to indicate the number of parts in the unit upon which the computations of that column are based. In the present instance, the several units consist respectively of 1, 2, 5, 10, 20 and 40 parts, but obviously the number of parts to be contained in the several units is a matter of expediency and may be varied at will. Cooperating with this elongated chart is a second indicating member which is preferably in the form of a wire, or other long thin member, and the two indicating members are so arranged that when in their normal or zero positions the wire will extend parallel with and directly in front of the center line of the chart and when the two indicating members have been moved away from their zero positions the wire will intersect the chart. Either of these indicating members may be associated with the load balance and either may be associated with the unit balance but I prefer to associate the chart with the load balance and the wire with the unit balance, as in this manner the chart may be maintained always in an upright position in which the computation may be easily read and, further, the wire is of a lighter construction and more conveniently moved about a fixed axis. In the present construction, the chart, which is shown at 35, is supported independently of the load balance and is so arranged that it will move in a direction substantially at right angles to its length along the beam of the load balance. As here shown, the chart is slidably mounted on a bar 36 which extends lengthwise of the beam or lever 6 and is supported by brackets 137 extending forwardly from the rear wall of the housing.

Figures 4, 5, 6, 7, 8:
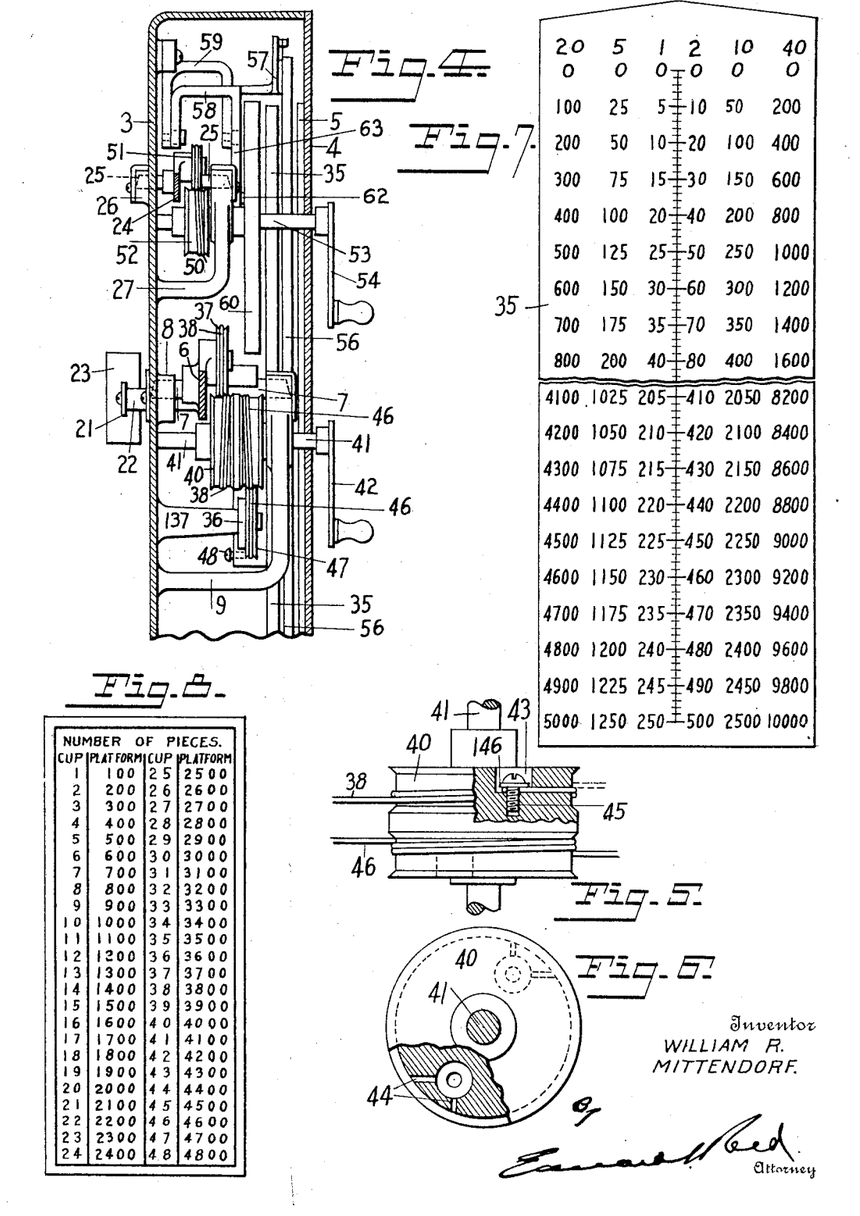
Fig. 4 is a section taken on the line 4—4 of Fig. 1.
Fig. 5 is a detail view, partly broken away, of the actuating drum for the poise of the load balance.
Fig. 6 is a side elevation of that drum, partly broken away.
Fig. 7 is a detail view of a computing chart which is partly broken away and Fig. 8 is a detail view of the wall chart for use in connection with the fixed ratio unit receptacle.

The chart 35 is so connected with the poise 20 that when the poise is adjusted to counterbalance the load on the load platform the chart will be moved into a position corresponding exactly with the position of the poise. In the present construction a suitable actuating device is provided which actuates both the poise and the chart. This actuating device may take various forms but it must be of such a character that it will not interfere with the free movement of the beam about its axis or in any way influence the balance of the beam. I accomplish this by so arranging the connection between the actuating device and the poise that it will have movement about the axis of the beam. In that particular form of actuating device here shown I have mounted on the beam, on opposite sides of the axis thereof, two pulleys 37 which, in the present instance, rotate about horizontal axes and about which extends an endless flexible member which is preferably in the form of a cable 38. A coiled spring 139 may be interposed in this endless flexible member to maintain the same always taut. One stretch of this endless belt or flexible member is connected with the poise 20 and, as here shown, the poise has an opening through which the lower stretch of the endless flexible member extends and in which it is secured in fixed relation to the poise by means of a screw 39. One stretch of the endless flexible member, preferably the lower stretch, is wound about a rotatable device, such as a drum 40, which is here shown as mounted on a shaft 41 journaled, on one side of the drum, in the rear wall of the housing, and on the other side of the drum in the upright arm of the bracket 9. The outer end of the shaft 41 extends beyond the front wall of the housing and is provided with a suitable handle or crank 42 for actuating the same. The endless member or cable is rigidly secured to the drum in fixed relation thereto but the connection is such that the drum may be adjusted relatively to the cable to alter their relative positions if desired. As here shown, the drum is provided in its lateral face with a recess 43 and leading to this recess from the periphery of the drum are openings 44 which are arranged at an angle one to the other and through which the cable 38 may extend. That portion of the cable which lies in the recess 43 passes beneath the head of a screw 45, which is preferably provided with a washer 146 and which serves to clamp the cable firmly against the base of the recess, thereby securing it rigidly to the drum. The cable being maintained taut at all times it will be obvious that it will respond to the slightest movement of the drum. The axis of the drum is preferably arranged directly beneath the axis of the beam and is spaced from the axis of the beam a distance equal to the radius of the drums so that that portion of the periphery of the drum lying directly above its axis will be in alinement with the axis of the beam. Inasmuch as the cable of the flexible member 38 leads from the drum in a substantially horizontal direction it will be apparent that the point of tangential contact between the cable and the drum is at the axis of the beam. Consequently there will be no variation in the length or tension of the cable due to the movement of the beam about its axis and neither the cable nor the drum will in any way influence the movement of the beam. This actuating device for the poise may be connected with the chart 35 in any suitable manner but I have, in the present instance, utilized an endless belt or cable which is actuated by the drum 40 for shifting the chart, so that the movement of the chart will be directly proportionate to and, in the present instance, exactly equal to the movement of the poise. As here shown, an endless belt or cable 46 extends about pulleys 47 mounted at the respective ends of the bar 36 upon which the chart 35 is mounted. This cable is connected at 48 with the chart and may, if desired, be provided with a coiled spring 49 to maintain the same taut. One stretch of the belt 46, in the present instance the upper stretch, is passed about the drum 40, which is preferably formed in two parts of equal diameter, as shown in Fig. 5, and the belt or cable 46 is rigidly secured to the drum in the same manner that the cable 38 is secured thereto. It will be apparent, therefore, that the operation of the crank 42 will adjust both the poise and the computing chart without interfering in any way with the operation of the beam and will maintain the poise and the beam in a definite relation one to the other.

A suitable actuating device is also provided to adjust the poise 32 on the beam 34 of the unit balance and this actuating device is, in the present instance, substantially similar to the actuating device for the poise of the load balance. It consists of an endless member or cable 50 which passes about pulleys 51 mounted on the beam or lever 24 on opposite sides of its axis and which is connected with the poise 32. The lower stretch of the belt 50 is wound about a drum 52 and is secured thereto in the same manner that the cable 38 is secured to the drum 40. The drum 52 is mounted on a shaft 53 journaled on one side of the drum in the rear wall of the housing and on the other side of the drum in the upright arm of the bracket 27. The forward end of the shaft projects beyond the front wall of the housing and is provided with an operating handle or crank 54 by means of which the drum may be rotated. The drum is arranged in the same relation to the axis of the beam 24 that the drum 40 is arranged with relation to the axis of the beam 6 of the load balance and the flexible actuating member or cable 50 has tangential contact with the periphery of the drum at the axis of the beam. This actuating device for the poise of the unit balance is operatively connected with the second indicating member so that that indicating member will be moved to a position corresponding to the position of the poise of the unit balance. This second indicating member preferably consists of a long thin member, such as a wire 55, which is carried by a supporting bar 56 the upper end of which is rigidly secured to an arm 57 forming part of a member 58 which is pivotally mounted on the arms of a bracket 59 carried by the rear wall of the housing. Movement may be imparted from the actuating device for the poise 32 to this pivoted indicating member in any suitable manner but I prefer to utilize a cam for this purpose. To this end I have rigidly secured to the shaft 53 of the drum 52 a cam disk 60 having in one face thereof a cam groove 61 into which extends a pin or projection 62 carried by a rock arm 63 rigidly secured to the pivoted structure 58 which carries the second indicating member 55. The cam groove is so shaped that as the drum is rotated the pivoted indicating member will be moved a distance directly proportionate to the distance that the poise 32 is moved, thus causing the same to assume an inclined position in which it will intersect the computing chart 35 when the latter has been moved from its zero position.

In the operation of the device to count the number of parts in a mass of unknown quantity the mass of parts is placed upon the load platform 13 and the handle 42 of the actuating device manipulated to move the poise 20 into a position on the beam 6 in which it will exactly counterbalance the load on the platform, that is, in which a state of equilibrium will be established in the load balance mechanism. The position to which the chart is thus moved is significant of the weight of the load. The handle 54 of the operating device for the poise of the unit balance is then rotated a distance sufficient to move the indicator wire 55 to a position in which it will intersect the lowest graduation on the computing chart. A unit consisting of a number of parts corresponding to one of the designations on the computing chart is then placed in the unit receptacle 28, the particular number of parts depending upon the weight required to overbalance the weight of the poise 32 and thus cause the outer or right hand end of the beam 24 to move upward against its limiting stop. After the unit balance has thus been overbalanced the actuating device is again manipulated to move the poise into a position in which it will counterbalance the unit in the unit receptacle and thus establish a condition of equilibrium in the unit balance. This further adjustment of the poise 32 of the unit balance will shift the pivoted indicating member or wire 55 along the series of graduations on the chart and when the unit balance is in a state of equilibrium this wire will intersect a graduation on the chart which when read in the column of numerals corresponding to the unit in the unit receptacle, will denote the number of pieces in the load on the load platform.

Should the mass of parts which it is desired to count be of a weight greater than the capacity of the scale, which is twenty pounds, this mass can be counted at a single operation, without the necessity of subdividing the mass, by providing the beam of the load platform with a unit receptacle which is connected with the beam at a fixed point and constitutes a fixed ratio unit receptacle. In the present instance this unit receptacle is shown at 66 and is supported by a holder 67 which is secured to the counter poise 14. To count the number of parts in the mass of excess weight I proceed in the following manner: The poise 20 of the load balance is moved outwardly along the beam 6 until the pointer 64 on the computing chart registers with the twenty pound graduation on the series of weight graduations 65, thereby placing the poise and the computing chart in their outermost positions; and then placing in the fixed ratio unit receptacle 66 a sufficient number of the parts to overbalance the load on the platform of the load balance, thus causing the outer end of the beam or lever 6 to move downwardly against its limiting stop. The actuating device for the poise 20 is then moved in a reverse direction to carry the poise inwardly a distance sufficient to place the beam in a state of balance. The actuating device for the poise of the unit balance is then operated sufficiently to move the pivoted indicating wire into a position in which it will intersect the lowest graduation on the computing chart. A unit is then placed in the unit receptacle 28 of the unit balance, this unit consisting of a definite number of parts corresponding to one of the series of columns on the computing chart. The particular unit used should be of sufficient weight to overbalance the weight of the poise 32 and to cause the outer end of the beam 24 to move upwardly against its limiting stop. The actuating device for the unit balance is then further actuated to so position the poise 32 that the beam of the unit balance will be placed in a state of balance. This further adjustment of the poise of the unit balance causes the indicating wire to be so positioned with relation to the computing chart that the graduation on the chart which is intersected by the wire, when read in the column of numerals on the chart corresponding to the number of parts constituting the unit in the unit receptacle, will denote the number of parts in that portion of the load on the load platform which is not counterbalanced by the parts in the fixed ratio unit receptacle 66. The ratio between the fixed ratio unit receptacle 66 and the load platform 13 is, we will say, 100 to 1 and to determine the number of parts in that portion of the load which is counterbalanced by the parts in the fixed ratio unit receptacle I multiply the number of parts in said fixed ratio unit receptacle by 100, and then add the product to the computation indicated on the computing chart and the sum will be the total number of parts in the mass on the load platform.

When it is desired to count out a certain predetermined number of parts the operator will first note whether or not the number of parts desired appears on the computing chart and if it does he will note in what series of numerals it appears in the lowest position on the chart. He will then place in the unit receptacle of the unit balance the number of parts corresponding to the series of numerals thus selected and will adjust the poise 32 to establish a condition of equilibrium in the unit balance. He will then operate the actuating device for the poise and chart of the load balance until the chart has moved a distance sufficient to bring into registration with the indicator wire 55 the particular graduation on the chart which corresponds to the desired number of parts. The parts are then placed on the load platform in sufficient numbers to balance the beam 6 of the load mechanism and the number of parts required to accomplish this will be the number desired.

If it is desired to count out a lot of parts greater in number than the largest numeral on the chart the count can be made in one operation as follows: Substract the largest numeral on the chart from the number of parts desired and place in the fixed ratio unit receptacle 66 a number of pieces equal to 1/100 of the remainder; then place in the unit receptacle 28 of the unit balance a number of parts corresponding to the series of numerals in which the largest number on the chart appears. The actuating device for the poise of the unit balance is then actuated until the beam 24 is in balance. The actuating device for the poise of the load balance is actuated to move the chart to a position in which the lowest graduation on the chart will be in registration with the indicator wire. The parts are then placed on the load platform in sufficient quantity to balance the beam 6 of the load balance and the number of parts required to so balance the beam 6 will be the desired number. The above methods of operation are those which will probably be more frequently used than any others but it will be obvious that in applying the scale to the various uses for which it is adapted various other methods of operation may be worked out.

While I have shown and described one embodiment of my invention I wish it to be understood that I do not desire to be limited to the details thereof as various modifications may appear to a person skilled in the art.

Having now fully described my invention, what I claim as new and desire to secure by Letters Patent, is:

1. In a counting scale, a load balance comprising a beam and a poise therefor, a unit balance comprising a beam and a poise therefor, indicating members arranged to cooperate one with the other to indicate the result of a computation, and means for controlling the positions of said indicating members according to the positions of the respective poises.

2. In a counting scale, a load balance comprising a beam and a poise therefor, a unit balance comprising a beam and a poise therefor, indicating members arranged to cooperate one with the other to indicate the result of a computation, and means for causing said indicating members to assume positions corresponding to the position of the poises with relation to the respective beams.

3. In a counting scale, a load balance comprising a beam and a poise therefor, a unit balance comprising a beam and a poise therefor, an indicating member associated with each poise, said indicating members being arranged to cooperate one with the other to indicate the result of a computation and means for adjusting each poise and its indicating member simultaneously.

4. In a counting scale, a load balance comprising a beam and a poise therefor, a unit balance comprising a beam and a poise therefor, an indicating member associated with each poise, said indicating members being arranged to cooperate one with the other to indicate the result of a computation means for adjusting each poise, and means controlled by said adjusting means for adjusting the corresponding indicating member.

5. In a counting scale, a load balance comprising a beam and a poise therefor, a unit balance comprising a beam and a poise therefor, indicating members associated with the respective poises, and means for moving said indicating members into intersecting positions having a fixed relation to the positions of the respective poises and thereby cause said indicating members to indicate at the point of intersection the result of the computation.

6. In a counting scale, a load balance coming a beam and a poise therefor, a unit balance comprising a beam and a poise therefor, an indicating member associated with one of said poises and mounted for bodily movement, means controlled by the movement of said poise for moving said indicating member into a position corresponding to the position of said poise, a second indicating member associated with the other poise and mounted for pivotal movement, and means controlled by the movement of said other poise for moving said second indicating member into a position corresponding to the position of its poise and in which it will cooperate with the first mentioned indicating member to indicate the result of a computation.

7. In a counting scale, a load balance comprising a beam and a poise therefor, a unit balance comprising a beam and a poise therefor, indicating members associated with the respective balances but mounted independently thereof and arranged to cooperate one with the other to indicate the result of the computation, and means for causing said indicating members to assume positions corresponding to the positions of the poises of the respective balances.

8. In a counting scale, a load balance comprising a beam and a poise therefor, a unit balance comprising a beam and a poise therefor, a pivoted indicating member mounted independently of said balances, means for operatively connecting said indicating member with one of said poises, a bodily movable indicating member supported independently of said balances, and means for operatively connecting the last mentioned indicating member with the other of said poises and causing it to be moved to a position determined by the position of said poise, in which position it will cooperate with said pivoted indicating member to indicate the result of a computation.

9. In a counting scale, a load balance comprising a beam and a poise therefor, a unit balance comprising a beam and a poise therefor, a chart associated with the poise of one of said balances, an indicating member associated with the poise of the other of said balances, and means controlled by the movement of the respective poises for moving said chart and said indicating member into intersecting positions and to thereby indicate on said chart at the point of intersection the result of a computation.

10. In a counting scale, a load balance comprising a beam and a poise therefor, a unit balance comprising a beam and a poise therefor, a chart mounted for bodily movement, means for operatively connecting said chart with the poise of said load balance, a pivoted indicating member arranged to cooperate with the first mentioned indicating member to indicate the result of a computation, and means for operatively connecting said pivoted indicating member with the poise of said unit balance, whereby the positions of said chart and said indicating member will be controlled, respectively, by the movement of said poises.

11. In a counting scale, a load balance comprising a beam and a poise therefor, a unit balance comprising a beam and a poise therefor, a chart slidably supported independently of said load balance, means for operatively connecting said chart with the poise of said load balance, an indicating member pivotally mounted independently of said unit balance and arranged to cooperate with the first mentioned indicating member to indicate the result of a computation, and means for operatively connecting said indicating member with the poise of said unit balance, whereby the position of said chart and said indicating member will be controlled respectively by the movements of said poises.

12. In a counting scale, a load balance comprising a beam and a poise therefor, a unit balance comprising a beam and a poise therefor, indicating devices associated with the respective balances, movably mounted independently thereof and arranged to cooperate to indicate the result of a computation, and devices associated with the respective balances for adjusting the poises and indicating members thereof.

13. In a counting scale, a load balance comprising a beam and a poise therefor, a unit balance comprising a beam and a poise therefor, indicating devices associated with the respective balances and movably mounted independently thereof, a device for adjusting the poise and indicating member of one of said balances, said device comprising a cam to control the position of said indicating member, and other means for adjusting the indicating member and poise of the other balance.

14. In a counting scale, a load balance comprising a beam and a poise therefor, a unit balance comprising a beam and a poise therefor, indicating devices associated with the respective balances and movably mounted independently thereof, a rotatable drum, flexible connections between said drum and the poise and indicating member of one of said balances, and other means for adjusting the indicating member and poise of the other balance.

15. In a counting scale, a load balance comprising a beam and a poise therefor, a unit balance comprising a beam and a poise therefor, indicating devices associated with the respective balances and movably mounted independently thereof, a rotatable drum, flexible connections between said drum and the poise and indicating member of one of said balances, and a device for adjusting the poise and indicating member of the other of said balances, said device comprising a cam to control the position of said indicating member.

16. In a scale, a balance comprising a beam and a poise carried thereby, an adjusting device for said poise comprising a part separate from and operatively connected with said poise, said part being connected with said beam on opposite sides of the axis thereof and being so arranged that the distribution of the weight of said part with relation to the axis of said beam will be the same in all positions of said poise, and an actuating device for said part mounted independently of said beam.

17. In a scale, a balance comprising a beam and a poise carried thereby, an adjusting device for said poise comprising a part separate from and connected with said poise and connected with said beam on opposite sides of the axis thereof and so arranged that the distribution of the weight of said part on said beam will be the same in all positions of said poise, and a part movable independently of said balance, one of said parts having movement relatively to the other about the axis of said beam.

18. In a weighing mechanism comprising a beam, a poise movable thereon, a drum mounted on a fixed axis, means for rotating said drum, and a flexible member wound on said drum and operatively connected with said poise, the point of tangential contact between said flexible member and said drum being coincident with the axis of said beam.

19. In a scale, a balance comprising a beam and a poise carried thereby, a device for adjusting said poise comprising a rotatable member mounted independently of said balance, and a flexible member connecting said poise with said rotatable member and with said beam and having tangential contact with said rotatable member at a point coincident with the axis of said beam.

20. In a scale, a balance comprising a beam and a poise carried thereby, a device for adjusting said poise comprising a drum, and a flexible member carried by said beam and connected with said drum, said flexible member having tangential contact with said drum at a point in line with the axis of said beam.

21. In a scale, a balance comprising a beam and a poise carried thereby, a device for adjusting said poise comprising a drum mounted independently of said balance, an endless flexible member carried by said beam, connected with said poise, and extending about said drum.

22. In a scale, a balance comprising a beam and a poise carried thereby, a device for adjusting said poise comprising a drum mounted independently of said balance, an endless flexible member carried by said beam, connected with said poise, extending about said drum and having tangential contact with said drum at a point in line with the axis of said beam.

23. In a scale, a balance comprising a beam and a poise carried thereby, pulleys mounted on said beam on the opposite sides of its axis, an endless member extending about said pulleys and connected with said poise, and an actuating device for said endless member connected therewith at a point substantially in line with the axis of said beam.

24. In a scale, a balance comprising a beam and a poise carried thereby, pulleys mounted on said beam on the opposite sides of its axis, an endless member extending about said pulleys and connected with said poise, a drum rotatably mounted adjacent to said beam, said endless member having a part extending about said drum and secured thereto, and means for rotating said drum.

25. In a scale, a balance comprising a beam and a poise carried thereby, pulleys mounted on said beam on the opposite sides of its axis, an endless member extending about said pulleys and connected with said poise, a drum rotatably mounted adjacent to said beam, said endless member having a part wound about said drum and having tangential contact therewith at a point substantially in line with the axis of said beam, means for rigidly securing said endless member to said drum, and means for rotating said drum.

26. In a scale, a balance comprising a beam and a poise carried thereby, an indicating member mounted independently of said beam and movable lengthwise thereof, an adjusting device for said poise mounted independently of said poise and said indicating member, and an operative connection between said adjusting device and said indicating member.

27. In a scale, a balance comprising a beam and a poise carried thereby, an indicating member associated with said balance and movable relatively thereto, an adjusting device for said poise mounted independently of said poise and said indicating member and so arranged that it will not influence the movement of said beam, and an operative connection between said adjusting device and said indicating member.

28. In a scale, a balance comprising a beam and a poise carried thereby, an indicating member associated with said balance and movable relatively thereto, an adjusting device for said poise comprising a rotatable member mounted independently of said balance, a flexible member extending about said rotatable member and connecting the same with said poise and said beam and having tangential contact with said rotatable member at a point substantially in line with the axis of said beam, and an operative connection between said rotatable member and said indicating member.

29. In a scale, a balance comprising a beam and a poise carried thereby, an indicating member associated with said balance and movable relatively thereto, an adjusting device for said poise comprising a rotatable member mounted independently of said balance, a flexible member connecting said rotatable member with said poise and having tangential contact with said rotatable member at a point substantially in line with the axis of said beam, and a second flexible member connecting said rotatable member with said indicating member.

30. In a scale, a balance comprising a beam and a poise carried thereby, an indicating member associated with said balance and movably mounted independently thereof, a drum rotatably mounted adjacent to said beam, an endless flexible member supported on said beam, extending about said drum and connected with said poise, and means actuated by said drum for adjusting said indicating member.

31. In a scale, a balance comprising a beam and a poise carried thereby, an indicating member associated with said balance and movably mounted independently thereof, a drum rotatably mounted adjacent to said beam, an endless flexible member supported on said beam, extending about said drum and connected with said poise, and a second endless flexible member extending about said drum and operatively connected with said indicating member.

32. In a scale, a balance comprising a beam and a poise carried thereby, a bar mounted independently of said balance and extending lengthwise of said beam, an indicating member slidably mounted on said bar, a rotatable drum mounted adjacent to said beam and said bar, guide pulleys mounted on said beam on opposite sides of its axis, an endless flexible member extending about said pulleys and said drum, and connected with said poise, guide pulleys mounted on said bar near the ends thereof, and a second flexible member extending about the guide pulleys on said bar, about said drum and connected with said indicating member.

33. In a scale, a balance comprising a beam and a poise carried thereby, an indicating member associated with said balance and movably mounted independently thereof, an adjusting device for said poise, an operative connection between said adjusting device and said indicating member, said scale having a fixed part provided with a series of weight graduations, and a pointer carried by said indicating member to cooperate with said weight graduations.

34. In a scale, a balance comprising a beam and a poise carried thereby, an indicating member associated with said balance and movably mounted independently thereof, an adjusting device for said poise, a connection comprising a cam interposed between said adjusting device and said indicating member.

35. In a scale, a balance comprising a beam and a poise carried thereby, an adjusting device for said poise mounted independently of said poise, an indicating member associated with said balance and pivotally mounted independently of said balance and said adjusting device, and an operative connection between said adjusting device and said indicating member.

36. In a scale, a balance comprising a beam and a poise carried thereby, an indicating member associated with said balance and pivotally mounted independently thereof, an adjusting device for said poise, and a cam controlled connection between said adjusting device and said pivoted indicating member.

37. In a scale, a balance comprising a beam and a poise carried thereby, an indicating member associated with said balance and pivotally mounted independently thereof, an adjusting device for said poise, a cam connected with said adjusting device, and an actuating arm connected with said pivoted indicating member and arranged to be acted upon by said cam.

38. In a scale, a balance comprising a beam and a poise carried thereby, an indicating member associated with said balance, and pivotally mounted independently thereof, a drum mounted adjacent to said beam, an endless flexible member supported on said beam, connected with said poise and extending about said drum, a cam connected with said drum, and a rock arm connected with said pivoted indicating member and arranged to be acted upon by said cam.

39. In a counting scale, a load balance comprising a beam and a poise therefor, a unit balance comprising a beam and a poise therefor, indicating members the positions of which are controlled by the respective poises and which are arranged to cooperate one with the other to indicate the result of a computation, and a unit receptacle connected with the beam of said load balance.

40. In a counting scale, a load balance comprising a beam and a poise therefor, a unit balance comprising a beam and a poise therefor, an indicating member associated with each poise, said indicating members being arranged to cooperate one with the other to indicate the result of a computation, means for adjusting each poise, means controlled by each adjusting means for adjusting the corresponding indicating member, and a unit receptacle connected with the beam of said load balance.

41. In a counting scale, a load balance comprising a beam and a poise therefor, a unit balance comprising a beam and a poise therefor, and cooperating indicating members associated with the respective poises and the relative positions of which signify the relative values established by the respective poises.

42. In a scale, a balance comprising a beam, and a poise carried thereby, an indicating member mounted independently of said balance but movable relatively thereto, an actuating device for moving said poise on said beam, said actuating device being supported independently of said poise and said indicating member, and an operative connection between said actuating device and said indicating member.

43. In a scale, a balance comprising a beam and a poise carried thereby, an actuating device for moving said poise on said beam, said device comprising a part connected to said poise and to said beam and extending from said poise to the axis of said beam, said part having an operative portion which varies in length as said poise is moved back and forth on said beam.

44. In a counting scale, a load balance comprising a beam and a poise therefor, a unit balance comprising a beam and a poise therefor, indicating devices associated with the respective balances and arranged to be moved into cooperative relation to effect a computation based upon the relative positions of the respective poises.

In testimony whereof, I affix my signature hereto.

WILLIAM R. MITTENDORF.